3,152,086
PROCESS FOR PREPARING A MANGANESE ACTIVATED CADMIUM CHLOROPHOSPHATE PHOSPHOR
Richard C. Ropp, Towanda, Pa., assignor to Sylvania Electric Products Inc., a corporation of Delaware
No Drawing. Filed Mar. 25, 1960, Ser. No. 17,465
2 Claims. (Cl. 252—301.6)

The instant invention relates to phosphors for excitation by ultra-violet radiation, cathode rays, X-rays and the like. Particularly, this invention relates to phosphors for fluorescent lamps. More specifically, the invention relates to cadmium chlorophosphate activated by manganese for use in fluorescent lamps.

It is an object of the instant invention to provide for an improved cadmium chlorophosphate having an excellent response to 2537 A. excitation as well as an improved red rendition.

It is a further object to provide lamps made from cadmium chlorophosphate phosphor having a brightness considerably in excess of those prepared from calcium halophosphate.

It is a further object to provide a method for the manufacture of raw materials for the production of the cadmium chlorophosphate phosphor, which phosphor will be utilized in fabricating the improved lamp.

It is a further object of the invention to provide for improved lamp quality by using component raw materials for the phosphor having a high bulk density, particularly cadmium ammonium phosphate hydrate having a high bulk density.

It is a further object of this invention to provide a lamp having a coating of a manganese activated cadmium chlorophosphate phosphor on the interior surface thereof. It is surprising that the cadmium chlorophosphate which is activated by ultraviolet light outside of the environment of the fluorescent lamp displays quite different luminescent properties than the same phosphor when activated in a lamp.

Other objects, features and advantages of the instant invention will become apparent to those skilled in the art from the following specification.

It is known that when cadmium ammonium phosphate hydrate cadmium oxide, manganous ammonium phosphate hydrate and cadmium chloride are mixed together in suitable proportions and fired in air, cadmium chlorophosphate phosphor is produced. When this cadmium chlorophosphate phosphor is made into lamps, however, the quality of the lamps is quite poor.

It has now been found that if the phosphor contains no sulfate as a contaminant the lamp quality is materially improved. A major source of this contamination is the raw materials of the phosphor and the manner in which they are prepared. Lamps fabricated from the phosphor which was prepared from component raw materials containing contaminating sulfate are quite poor in quality whereas those made from raw materials containing no sulfate contaminants have excellent brightness.

The phosphor that is produced by a procedure for the manufacture of the raw materials which avoids any sulfate contamination is far superior to those now currently in use. The importance of the solution from which the raw materials are precipitated is shown in the following table of lamp data.

TABLE I

| Raw Materials Prepared From— | Lumens Per Watt | | | Plaque Brightness, Percent |
|---|---|---|---|---|
| | 0 Hrs. | 100 Hrs. | 300 Hrs. | |
| Sulfate solution | 63.0 | 42.9 | 38.4 | 110 |
| Nitrate solution | 75.2 | 64.2 | 59.7 | 100 |
| Acetate solution | 71.5 | 59.5 | 53.5 | 100 |

Plaque brightness is determined by placing a sample on a testing sheet and exposing the sheet to the effect of the ultra-violet discharge. The lamp brightness on the other hand is a test of the lamp itself and is determined by fabricating a lamp with the given phosphor and testing the phosphor where it is exposed to the action of the mercury vapor.

The plaque brightness was obtained by using an arbitrary standard of the conventional cadmium chlorophosphate. As may readily be seen the plaque brightness is not comparable to the lamp brightness.

It will be understood that a phosphor that is produced from raw materials originating from a sulfate solution gives a higher plaque brightness reading than the phosphors which are produced from a sulfate-free solution. However, identical phosphors produced from identical solutions that are tested in lamp testing devices show diametrically opposite results. This finding is entirely unexpected.

It is thus readily apparent that the absence of sulfate is essential to produce a lamp having sufficient brightness, but which still has a good maintenance factor at 100 hours of life. Therefore, the raw materials from which the phosphor is prepared are of critical importance.

Four materials are used in preparing the composition from which the phosphor is prepared; namely, cadmium ammonium phosphate hydrate, cadmium peroxide, manganous ammonium phosphate and cadmium chloride.

By way of example, without limiting the claims, a method of preparing the cadmium ammonium phosphate hydrate is to dissolve the soluble cadmium salt in water, said salt being either organic or inorganic; the resulting cadmium ion is then reacted with excess anhydrous ammonia. A precipitate of cadmium hydroxide is thus formed. This cadmium hydroxide is then reacted with the excess of the ammonia to form a soluble ammino-cadmium complex, $Cd(NH_3)_4^{++}$. To this soluble complex, diammonium phosphate is added and the resulting cadmium ammonium phosphate hydrate is washed and dried in a conventional manner.

It is to be noted that cadmium sulfate should not be used as a cadmium ion source due to the sulfate ion contamination. It is also preferred not to utilize cadmium chloride due to the possibility of forming a basic chloride precipitate, CdOHCl; however, if the pH is kept above 6.5, the possibility is lessened.

In the preparation of the cadmium peroxide, hydrogen peroxide is added to the ammino-cadmium complex, $Cd(NH_3)_4^{++}$, which is prepared in a manner described above. A precipitate of cadmium peroxide results from this addition. This precipitate is washed and dried in a conventional manner.

Although other methods of preparation of the cadmium ammonium phosphate hydrate and cadmium peroxide are available, the above described procedures are highly desirable because a purification step is obtained during preparation. Heavy metal hydroxides are insoluble and may be removed by filtration before the diammonium phosphate or hydrogen peroxide is added. In the procedure above described, raw materials are obtained which produce a phosphor containing heavy metal impurities no higher than 50 p.p.m.

The manganous ammonium phosphate hydrate is produced by dissolving a soluble manganous salt, either organic or inorganic, in water and a solution of diammonium phosphate is added thereto. The resulting precipitate suspension is then adjusted to a pH of 6 with ammonium hydroxide.

Another important aspect of the instant invention concerns the improvement in lamp quality obtained from raw materials having certain physical properties. Quite surprisingly, it has been found that a high bulk density of the raw materials, particularly the $CdNH_4PO_4 \cdot H_2O$, produces a phosphor yielding a lamp with brightness considerably above even the improved cadmium chlorophosphate mentioned above and shown in Table I. More particularly, these additional benefits are obtained if the bulk density is kept above about 10 grams per cubic inch.

In Table II are shown the plaque brightnesses and lamp data obtained for phosphors made from high and low bulk density raw materials which were prepared from both nitrate and acetate solutions.

TABLE II

| $CdNH_4PO_4$ From— | Bulk Density[1] | L.P.W. | | | Plaque Brightness, percent |
| --- | --- | --- | --- | --- | --- |
| | | 0 Hours | 100 Hours | 300 Hours | |
| Nitrate Solution: | | | | | |
| Low Bulk Density | 4.83 | 76.3 | 61.2 | 55.7 | 95 |
| High Bulk Density | 15.35 | 81.5 | 73.3 | 67.0 | 101 |
| Acetate Solution: | | | | | |
| Low Bulk Density | 5.21 | 71.5 | 59.5 | 53.5 | 91 |
| High Bulk Density | 14.81 | 80.6 | 72.0 | 66.2 | 100 |

[1] Grams per cubic inch.

These data show that the physical properties of the raw materials forming the phosphor markedly affect the lamp brightness of the phosphor so produced. Not only is the lamp brightness increased, but also maintenance is markedly improved, as shown in Table III.

TABLE III

| $CdNH_4PO_4$ From— | 100 hrs., l.p.w. | Percent Maintenance, 100 hrs. |
| --- | --- | --- |
| Sulfate solution | 42.9 | 68.2 |
| Nitrate solution: | | |
| Low Bulk Density | 61.2 | 80.2 |
| High Bulk Density | 73.3 | 90.0 |
| Acetate solution: | | |
| Low Bulk Density | 59.5 | 83.3 |
| High Bulk Density | 72.0 | 89.8 |

As will be seen from the foregoing Tables II and III, the percent maintenance and the brightness of the lamp is materially increased by using high bulk density raw materials for the preparation of the phosphor.

By way of illustration and not limitation, to obtain the high quality phosphor according to the instant invention, the following examples should be noted.

The cadmium ammonium phosphate hydrate, cadmium peroxide, manganese ammonium phosphate hydrate and cadmium chloride are mixed in the proper proportions by ball milling, hammer milling or other means that are suitable. After the mixture is prepared, it is fired in air at a suitable temperature, for example between 1100° F. and 2000° F., to eliminate combined water and to form the apatite matrix containing manganese as an activator.

As a specific embodiment of useful proportions and reaction conditions suitable to the instant invention, the following examples are shown.

*Example I*

| Component Raw Material | Wt. (Grams) | Assay, percent | Bulk Density, g./in. | Gram Moles |
| --- | --- | --- | --- | --- |
| $CdNH_4PO_4$ | 2,997.2 | 92.6 | 13.35 | 12.31 |
| $CdO_2$ | 709.1 | 97.8 | | 4.70 |
| $CdCl_2$ | 824.9 | 100 | | 4.51 |
| $MnNH_4PO_4$ | 43.0 | 93.6 | | .00294 |

The cadmium ammonium phosphate hydrate used as a component raw material in the instant example was prepared from a cadmium nitrate solution.

After the mixture of the component raw materials is prepared, it is fired in a crucible for 1.25 hours at about 1560°. After firing, the phosphor is rolled out and washed in water by decantation until free of soluble chloride. The phosphor is then filtered and dried.

*Example II*

| Component Raw Material | Weight | Assay, percent | Bulk Density | Gram Moles |
| --- | --- | --- | --- | --- |
| $CdNH_4PO_4$ | 3,008.9 | 92.5 | 14.81 | 12.35 |
| $CdO_2$ | 710.4 | 97.6 | | 4.80 |
| $CdCl_2$ | 824.6 | 100 | | 4.51 |
| $MnNH_4PO_4$ | 43.0 | 93.6 | | .00294 |

The cadmium ammonium phosphate hydrate used as a raw material in the instant example was prepared from a cadmium acetate solution.

After a mixture of the component raw materials is prepared, it is fired and washed in a manner similar to that set forth in Example I above.

It is readily apparent that modifications may be made within the scope and spirit of the invention by one skilled in the art. Applicant intends only to be limited in the invention by the appended claims.

I claim as my invention:
1. In the process for preparing a manganese activated cadmium chlorophosphate phosphor, the steps which comprise: preparing cadmium ammonium phosphate by reacting a cadmium salt with excess ammonia in a substantially sulfate free solution, the resulting precipitate being then reacted with diammonium phosphate in a substantially sulfate free solution, the bulk density of said cadmium ammonium phosphate being greater than 10 grams per cubic inch; mixing the formed sulfate free cadmium ammonium phosphate together with other ingredients necessary to form a manganese activated cadmium chlorophosphate phosphor; firing the mixture in a furnace to produce a manganese activated cadmium chlorophosphate phosphor substantially free of sulfate ions.

2. In the process for preparing a manganese activated cadmium chlorophosphate phosphor the steps which comprise: deriving from substantially sulfate ion free solutions cadmium ammonium phosphate and other starting materials necessary to form a manganese activated cadmium chlorophosphate phosphor, said cadmium ammonium phosphate being prepared by reacting a cadmium salt with excess ammonia in a substantially sulfate ion free solution, the resulting precipitate then being reacted with diammonium phosphate, the resulting cadmium ammonium phosphate having a bulk density greater than 10 grams per cubic inch; mixing together said sulfate ion free starting ingredients and firing in a furnace to form a substantially sulfate ion free, manganese activated cadmium chlorophosphate phosphor.

References Cited in the file of this patent
FOREIGN PATENTS
966,789   France _____ Mar. 15, 1960